United States Patent [19]

Tamblyn et al.

[11] Patent Number: 4,889,381
[45] Date of Patent: Dec. 26, 1989

[54] RETRACTABLE TRUCK BED COVER APPARATUS

[75] Inventors: Charles C. Tamblyn, Kirkland; Philip L. Forde, Bellevue, both of Wash.

[73] Assignee: American & Overseas Corporation, Bainbridge Island, Wash.

[21] Appl. No.: 173,360

[22] Filed: Mar. 25, 1988

[51] Int. Cl.⁴ ............................................. B60D 7/04
[52] U.S. Cl. ..................................... 296/98; 296/100; 160/33; 160/133
[58] Field of Search ................. 296/98, 100; 160/23.1, 160/26, 33, 133

[56] References Cited

U.S. PATENT DOCUMENTS

| | | | |
|---|---|---|---|
| 2,726,911 | 12/1955 | Mason | 160/133 X |
| 3,092,170 | 6/1963 | Ellis | 160/26 |
| 3,516,469 | 6/1970 | McDonald | 160/26 |
| 3,806,187 | 4/1974 | Bull | 296/100 |
| 4,210,361 | 7/1980 | Marvin et al. | 296/100 X |
| 4,252,362 | 2/1981 | Campbell | 296/100 X |
| 4,294,302 | 10/1981 | Ricke, Sr. | 160/133 |
| 4,519,434 | 5/1985 | Forquer | 160/133 |
| 4,563,034 | 1/1986 | Lamb | 296/98 |
| 4,611,848 | 9/1986 | Romano | 296/98 |
| 4,717,196 | 1/1988 | Adams | 296/98 |

Primary Examiner—Robert B. Reeves
Assistant Examiner—Andrew C. Pike
Attorney, Agent, or Firm—Graybeal, Jensen & Puntigam

[57] ABSTRACT

A retractable truck bed cover comprising a plurality of relatively narrow slats (12—12) which are rotatably interfitted together along their longitudinal edges by means of mating elements (26,28) so that the cover is flexible in its longitudinal direction. The slats include wheels (64) which extend from the opposite end edges thereof and which are mounted for rotation. The wheels are received into opposing side rails (36,38) which are mounted along the top edges of the truck bed. A cover retracting mechanism (18) is positioned adjacent the cab of the truck, and includes two vertical end pieces (100,102), on facing surfaces of which is located a shallow spiral track (108), which receives the wheels (64) of the succession of slats comprising the cover, permitting the cover to be conveniently rolled up upon itself.

15 Claims, 4 Drawing Sheets

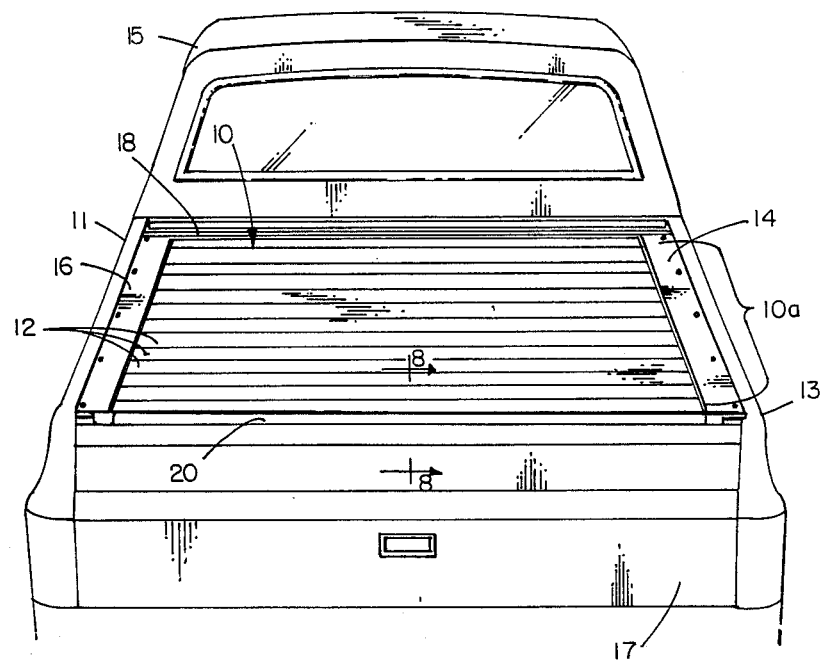
FIG. 1
FIG. 3
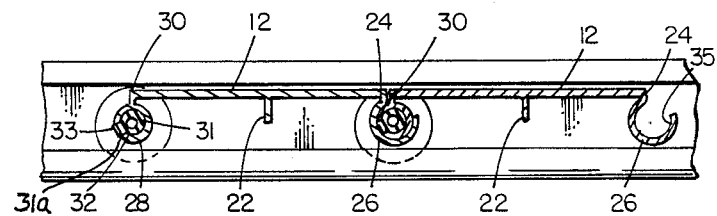

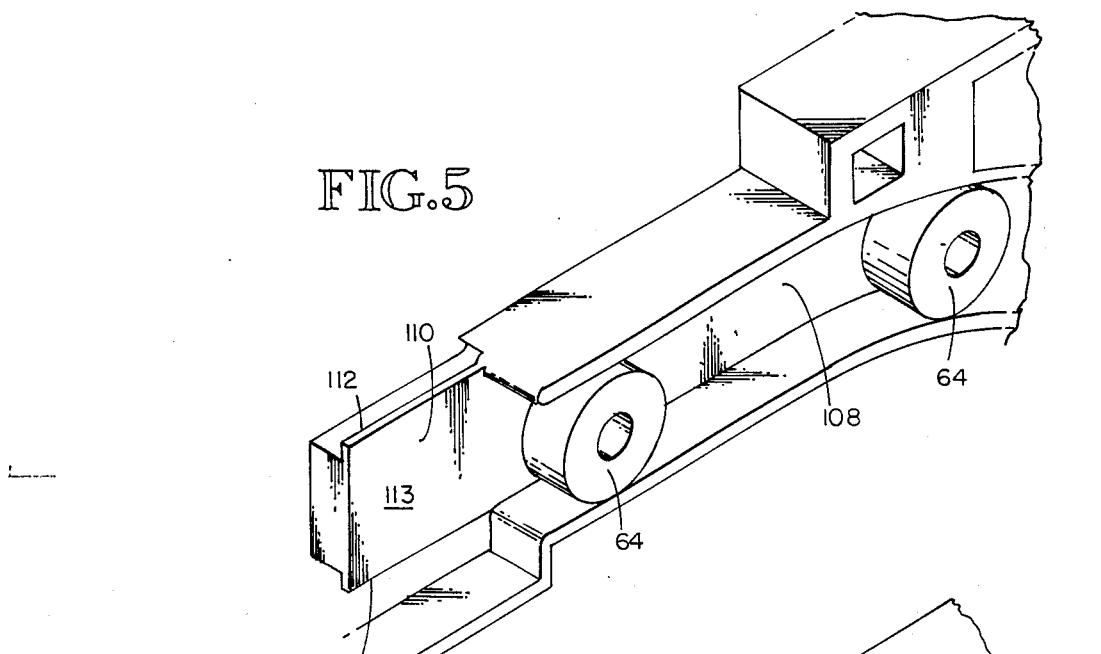
FIG.5
FIG.6
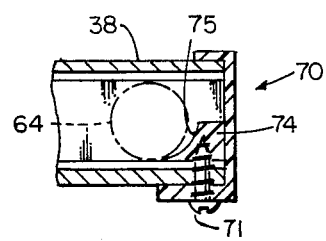
FIG.7
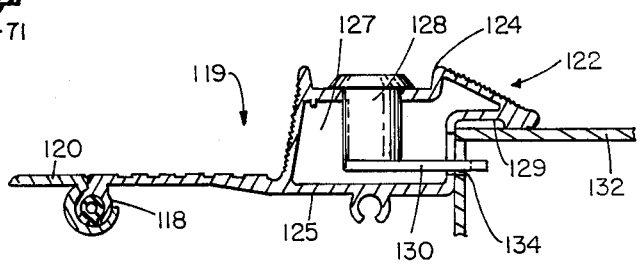
FIG.8

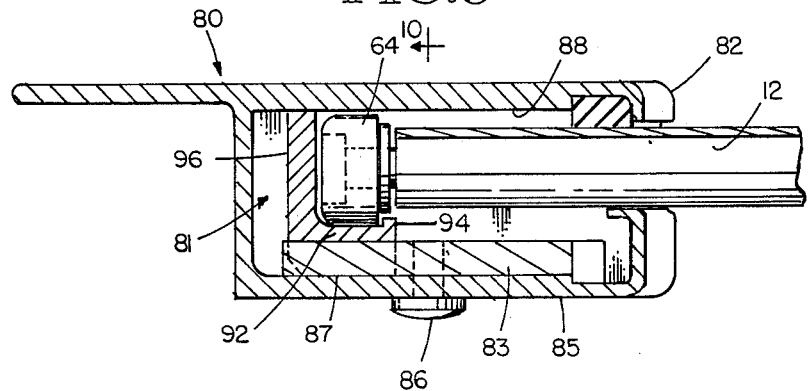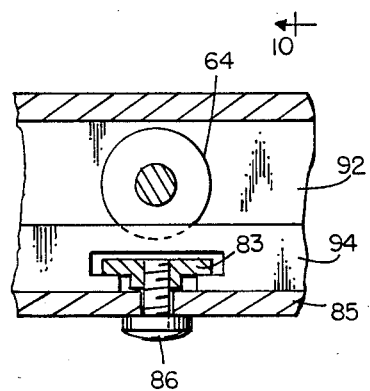

RETRACTABLE TRUCK BED COVER APPARATUS

TECHNICAL FIELD

This invention relates generally to the art of truck bed covers and more specifically concerns improvements to retractable truck bed covers.

BACKGROUND ART

There is a well established need for physical security for the interiors of pickup truck beds, which are otherwise completely exposed. Cloth or canvas covers which extend the length of the truck bed and are attached to the upper edge of the sides of the truck bed, such as by snaps or the like, are well known. However, such covers are basically for the purpose of appearance only, and do not provide any physical security, as they may be readily removed and/or cut. Solid truck bed covers which are secured to the truck sides provide a certain amount of protection, particularly if they are made of wood or metal, but they are typically cumbersome to handle, and must be stored away from the truck itself when not in use as a cover.

In order to provide the desired physical security, but also permit storage of the cover within the truck bed itself, the retractable truck bed cover was developed. Typically, such covers comprise a plurality of adjoining slats which are secured to each other in some fashion to provide a longitudinally flexible structure. An example of such a structure is shown in U.S. Pat. No. 4,611,848, issued on Sept. 16, 1986 to Romano. However, known retractable truck bed covers, including the one shown in the '848 patent, have several disadvantages. In particular, the mechanism for retracting the cover, which typically includes a drum with springs or other drive mechanisms, is complicated, expensive, and is not particularly reliable in operation.

Thus, there is a need for a simpler and more reliable mechanism to move the cover into a retracted position. Further, there is a need for some adjustability in the width of the truck bed cover between different trucks so that truck beds of slightly different width may be readily accommodated with one cover. Still further, there is a need for a simpler and more reliable slat design, to make the interconnection between adjacent slats sufficiently strong but with fewer parts and less expensive.

DISCLOSURE OF THE INVENTION

Accordingly, one aspect of the present invention is an apparatus for retracting a longitudinally flexible cover for a truck bed or the like which includes two opposing end pieces which are positionable on opposite sides of the truck bed near one end thereof, wherein the two end pieces have facing surfaces and the end pieces are supported in position relative to each other. The apparatus further includes a relatively shallow track which is located on the facing surfaces of the end pieces for receiving edge elements which extend from opposing end edges of a truck bed cover, the track being in the form of a spiral which closes gradually inwardly, such that the cover rolls up upon itself as the edge elements thereof move along the track.

Another aspect of the invention is an element for guiding and supporting the movement of a retractable cover for truck beds and the like, which includes a side rail which includes a portion configured to mount the side rail along the top edge of a side of the truck, wherein the side rail includes upper and lower portions which extend inwardly from the side of the truck bed, the upper and lower portions including facing surfaces. Each facing surface includes a plurality of grooves herein. The side rail includes a track portion defined in the lower portion to receive edge elements which extend from the end edges of the retractable cover and a longitudinally extending strip of flexible material, positioned between two facing grooves in the upper and lower portions a small distance from the edge elements.

Still further, another aspect of the invention includes a lateral slat for use in forming a truck bed cover or the like, the slat being elongated and relatively narrow, extending substantially between the respective sides of the truck bed when the cover is in position, the slat including a depending groove-like receiving element along one side edge and a depending tubular-like element along the opposing side edge adapted to rotatably engage in the groove-like portion of an adjacent slat, wherein a plurality of slat elements so fitting together form a cover which is flexible in its longitudinal direction.

BRIEF DESCRIPTION OF THE DRAWINGS

FIG. 1 is an isometric view showing the complete truck bed cover apparatus of the present invention in place on a pickup truck, the cover itself being shown in its extended position.

FIG. 2 is a partially exploded isometric view showing the cover retracting mechanism of the present invention as well as a portion of one side rail and portions of several adjoining slat elements.

FIG. 3 is a cross-sectional view of two adjoining slat elements.

FIG. 5 is an isometric view showing a portion of the cover retracting mechanism of FIG. 2, in particular the element for mating the cover retracting mechanism with the side rails.

FIG. 6 is an isometric view showing an end cap for the side rails.

FIG. 7 is a cross-sectional view of a portion of the element of FIG. 6.

FIG. 8 is a cross-sectional view showing the mechanism for locking the bed cover to the tailgate of a truck.

FIG. 9 is a lateral cross-sectional view showing a side rail adapted for tapered truck beds.

FIG. 10 is a partial longitudinal crosssectional view of the side rail of FIG. 9.

BEST MODE FOR CARRYING OUT THE INVENTION

Figure 4:
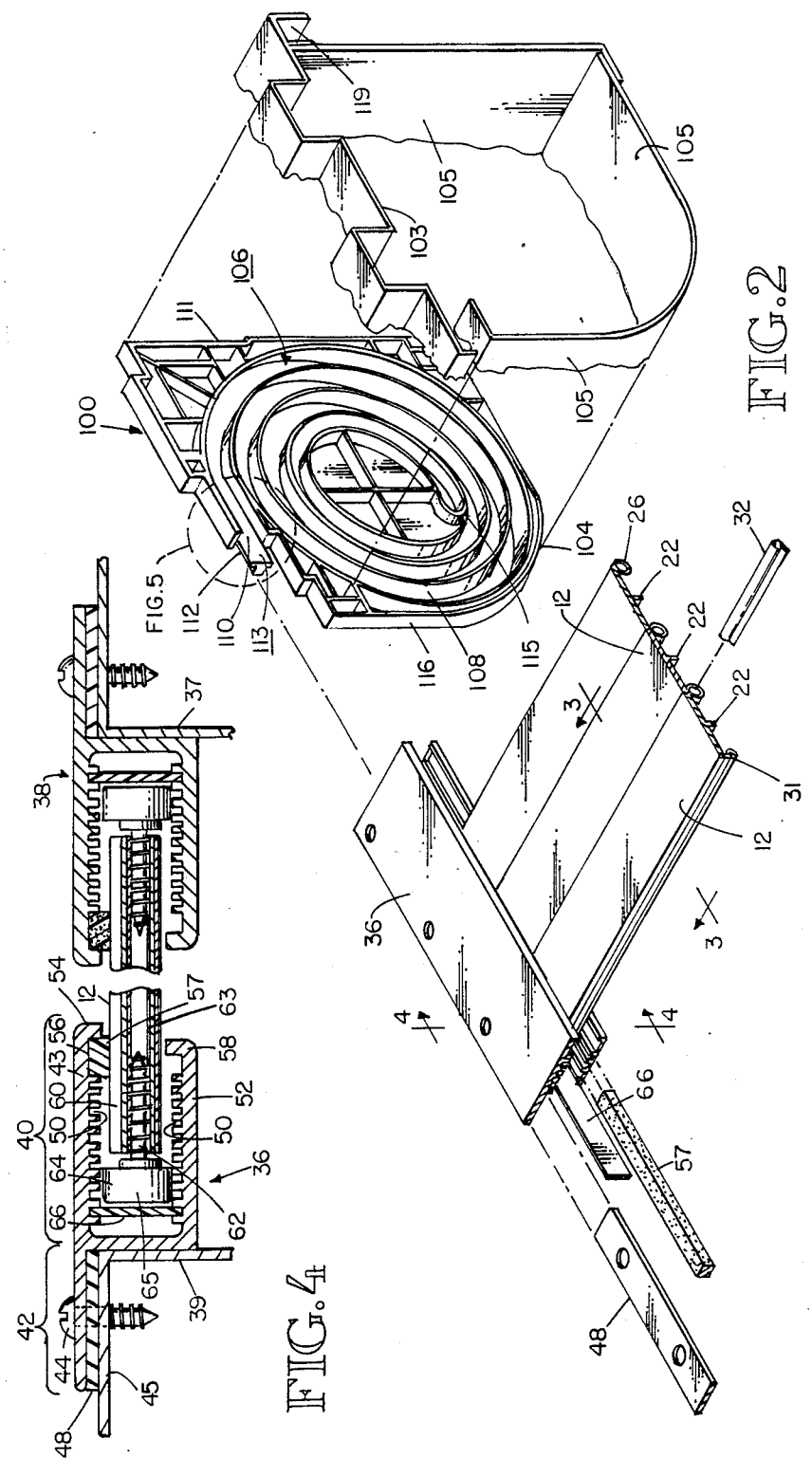
FIG. 4 is a cross-sectional view showing two side rails and the end portions of a single cooperating slat element extending between the two side rails.

FIG. 1 shows the retractable truck bed cover apparatus 10 of the present invention in its extended position on a pickup truck of conventional design. Generally, the truck bed cover apparatus 10 includes a plurality of slat-like elements 12—12 which extend laterally across the truck bed and are interconnected along their lateral edges to form the actual bed cover 10a, a pair of side rails 14 and 16 which are secured to the top edge of the respective sides 11 and 13 of the pickup truck bed, a cover retracting mechanism 18 which is out of sight in FIG. 1 beneath the slat-like elements 12—12 adjacent the rear end of the cab 15 of the truck, and a locking slat member 20 connected along one lateral edge to the rearmost of the slat-like elements 12—12 and lockable to the tailgate 17 of the truck. The structural details of the various portions of the cover apparatus 10 and their structural and operational relationship are shown in FIGS. 2—9 and described hereinafter.

FIGS. 2 and 3 show in more detail the lateral slat elements 12—12 which, when rotatably joined together along their respective adjacent lateral edges, form the flexible bed cover 10a. Each slat 12 in the embodiment shown is a relatively narrow, thin section of sheet metal. Alternatively, the slats can be made of plastic or a composite. In the embodiment shown, each slat is approximately 62 inches long (from side-to-side of the truck) by 2½ inches wide and is approximately 1/16 inch thick. These dimensions may vary. For consistency of explanation, the long edge of the slat is referred to as the lateral edge, since the slats extend laterally relative to the truck bed.

Depending downwardly from the lower surface of each slat 12 is a stiffener lip or rib 22 which in the embodiment shown extends along the middle of the slat 20 and is approximately ¼ inch high. The size of the rib 22 may vary as well as its position and the number thereof.

Along one lateral edge 24 (FIG. 3) of slat 12 is a depending grooved or trough-like element 26, which in the embodiment shown is integral with the remainder of slat 12. The grooved element 26 is in the shape of a C in cross-section, with circular exterior and interior surfaces, and with an internal diameter of slightly less than ⅜ inch. The grooved element 26 is open over an angle of about 60°, clockwise from the point where it meets with the remainder of slat 12.

A tubular element 28 depends from the other lateral edge 30 of each slat 12. Tubular element 28 has circular exterior and interior surfaces, like element 26, with an exterior diameter of approximately 5/16 inch. It has an opening 31a along its length, permitting access to the interior thereof.

The tubular element 28 positioned along one lateral edge 30 of a given slat 12 is adapted to fit into the grooved element 26 of the adjacent slat. Adjacent slats are thereby rotatable through a given angle relative to each other by virtue of the rotatable, interfitting relationship between the grooved member and tubular members of adjacent slats 12—12.

Fitted into the interior of the tubular element 28 along the length thereof is a rubber or plastic flexible element 32, one longitudinal portion 31 of which is configured to fit into the interior of the tubular element 28. In the embodiment shown, portion 31 mates with the interior surface of element 28. Another longitudinal portion 33 of element 32 extends through the opening 31a in the wall of tubular element 28, and sealingly fits against the inner surface 35 of grooved element 26. This arrangement has the important benefit of increasing the lateral strength of the cover 10a, as well as providing an effective seal for the cover to prevent penetration of water through the cover. The arrangement also significantly decreases rattles and other noise otherwise created by the plurality of joined slats.

FIGS. 2 and 4 show the side rail element which is adapted for use on most truck beds. FIG. 4 actually shows both sides 37, 39 of a truck bed, and hence, both side rails 36, 38, with a single shortened slat 12. FIG. 2 shows side rail 36 only. Side rail 36, which is exemplary, includes a C-shaped portion 40 and a lip portion 42 which extends laterally away from the C-shaped portion 40 in the same plane as the top leg 43 of the C-shaped portion 40. In the embodiment shown, C-shaped portion 40 is approximately 2 inches wide and 1½ inches deep. Side rail 36 is secured to the top edge 45 of the side 39 of the truck bed through spaced openings in the lip 42, by means of screws 44 or the like. Positioned between lip 42 and the top edge 46 of the sides of the truck bed is a gasket 48. Gasket 48 is made of plastic, silicon or neoprene, for instance, and seals the side rail to the edge 45 of the truck as well as protecting the finish of the truck.

The internal surfaces of the upper and lower legs 43 and 52 of the C-shaped portion 40 include a plurality of narrow grooves 50. Adjacent the free end 54 of the upper leg 43 is a wider groove 56 in which is positioned a length of flexible sponge-like material 57, which is held by friction in groove 56, and depends downwardly therefrom. Alternatively, sponge member 57 could be attached by an adhesive or it could be attached by an upper sticky surface to the internal surface of upper leg 43. The free end 54 of upper leg 43 extends a short distance downwardly therefrom, while the free end 58 of lower leg 52 extends a short distance upwardly, to form the C-shaped configuration of portion 40. The free end 54 is, in the embodiment shown, somewhat outboard of free end 58.

The end portion 60 of slat 12, by way of example, extends partially into the interior of the C-shaped portion 40 of side rail 36, as shown in FIG. 4. Extending from the end of the interfitted combination of the groove element and the tubular element of slats 12—12 is a screw 62 which is turned into the portion of the rubber element 63 near the end of slat 12. Screw 62 holds a plastic wheel 64, which could be also rubber or metal, in position at a point slightly removed from the end of slat 12. The wheel 64 rolls longitudinally of the truck bed between the upper and lower legs 43 and 52 of the C-shaped portion 40 of the side rail.

The sponge member 57 extends downwardly to contact the upper surface of the slats 12—12. The sponge helps to prevent dust and other debris from entering the side rail. It also acts to slow down the entrance of water into the side rail, so that water in effect seeps into the rail and down below the slat 12. The upwardly extending free end 58 of lower leg 52 forms a shallow channel or gutter in which water flows toward the cab of the truck into the enclosure for the retracting mechanism, as discussed in more detail below. This keeps the truck bed dry.

Immediately adjacent the outboard edge 65 of the rubber wheel 64 is positioned a relatively thin but rigid strip of plastic or metal 66, which is fitted along the length of the side rail 36 into two grooves which are in registry on the upper and lower legs 43 and 52 of the C-shaped portion. This strip 66 effectively becomes the "wall" of the truck for the purposes of the side rail. This prevents substantial side-to-side movement of the slats 12 and insures a secure fit for the cover when it is extended. The strip 66 is typically positioned in a selected pair of grooves to provide a ⅛ inch clearance between the strip 66 and the wheel 64. There is also a relatively secure fit vertically between the wheel 64 and the upper and lower legs of the C-shaped portion 40. This all is important in preventing buckling of the cover 10a as it is retracted. As can be seen, the grooves 50—50 in the upper and lower surfaces of legs 43, 52 permit some variation in the positioning of the thin strips 66. The grooves are usually ⅛ apart. Such an arrangement permits one cover apparatus to be used with truck beds of slightly varying width. The grooves also permit a sealing joinder between the cab end of the side rails and the end pieces of the retracting mechanism, as discussed in more detail below.

The tailgate end of the side rail 36, i.e. the end adjacent the tailgate 17 of the truck, terminates in an end piece or cap 70, shown in FIGS. 6 and 7, which is configured to snap in place around the crosssectional configuration of the side rails, i.e. side rail 38 in FIG. 6. Cap 70 is secured to the rear end of the side rail by means of two screws 71—71. Secured to, or an integral part of, the interior of cap 70 is a support member 74 which functions as a stop or chock for the wheel of the rearmost slat element 77. Chock 74 includes a portion 75 which is configured to mate with the wheel 64 extending from the rearmost slat. The chock 74 prevents the cover from breaking through the end cap 70. The screws 71 which hold cap 70 to the side rail extend into chock 74 for extra strength.

FIGS. 9 and 10 show another embodiment of a side rail which is adapted for use with trucks which have a tapering truck bed, i.e., where the width of the truck bed decreases somewhat from the cab to the tailgate. The body 80 of the side rail is similar to that shown in FIG. 4. In the embodiment of FIG. 9, however, there is an insert member 81 which is positioned interiorly of the body 80. The insert member 81 is L shaped in cross section and extends the length of the side rail and vertically between the lower interior surface 87 and the upper interior surface 88 of the C-shaped portion of body 80. The horizontal leg 92 of the L-shaped member 81 terminates in a slightly upwardly extending lip 94, thereby defining a shallow groove between lip 94 and the vertical leg 96 of the L-shaped member 81.

At spaced intervals along the length of the L-shaped member 81 in the horizontal leg 92 thereof are T-shaped openings, as most clearly shown in FIG. 10, which extend laterally through the horizontal leg 92, upwardly from the lower surface thereof to a point approximately one-half of the thickness of the horizontal leg 92. Positioned in these openings and extending outwardly from the horizontal leg 92 are T-nuts 83, which are secured to the lower portion 85 of body 80 by bolts 86. Tightening the bolts 86 results in the secure positioning of L-shaped member 81.

The body 80 of the side rail shown is secured to the top edges of the sides of the truck bed in a manner similar to that for the side rails shown in FIG. 4. The L-shaped member 81 in the embodiment of FIG. 9 is arranged lengthwise within the interior of the C-shaped portion of the body 80 so that the lateral distance between the opposing L-shaped members in the two spaced apart side rails remains the same longitudinally between the cab and the tailgate of the truck, even though the actual distance between the sides of the truck may decrease somewhat from cab to tailgate. The action of T-nuts 83 and bolts 86 hold the L-shaped members in the desired position. The end wheel 64 extending from the slat 12 rides in the shallow groove of the L-shaped member 81.

FIGS. 2 and 5 shows the truck cover retracting mechanism of the present invention. The retracting mechanism comprises generally two spaced apart vertical end pieces 100—100 (only one actually shown) which are in registry with each other, adjacent the rear surface of the truck cab and adjacent the interior sides of the truck bed. The two end pieces 100 are held in position relative to each other and the truck bed, in the embodiment shown, by elongated support members which extend between the two end pieces, as well as by a top element 103, a portion of which is shown in FIG. 2, which extends between the two end pieces 100 along the top edge thereof. Members 105—105 complete an enclosure. The spacing between the two end pieces is such that the wheels on opposing end edges of the slats are supported by the respective end pieces, as described below.

In the embodiment shown, the end pieces are basically square in outline, with the lower front corner 104 being curved, and the top edge having a particular configuration described in more detail below. In the embodiment shown, there is molded into the interiorly facing surface 106 of end piece 100, a spiral-shaped shallow groove or track 108. The opening 110 to the groove 108 is at the top of the end piece 100 near the front thereof. The top element 103 includes a corresponding opening along its length between the two end pieces 100—100. The groove 108 extends initially horizontally in a rearward direction for a short distance, and then begins to curve downwardly and then in upon itself with a gradually decreasing radius for several spirals. The embodiment shown includes 3½ spirals, but there could be more, or fewer spirals, depending on the length of the cover.

In the embodiment shown, the spiral groove or track is approximately ⅜ inch deep, with adjacent portions of the spiral being separated by a thin wall approximately ⅛ inch thick. The track 108 is thus U-shaped in cross-section. Extending forwardly from the opening 110 of groove 108 is a short tab 112, which is approximately one inch long and is T-shaped in crosssection. Tab 112 is adapted to fit into one of the grooves 50 at the cab end of the side rails 36, 38 to provide a continuous mating relationship between the side rails and the end pieces 100. For the side rail embodiment of FIG. 9, however, there is no tab but instead a socket, into which an end portion of that side rail fits.

As shown most clearly in FIG. 5, the wheels 64 which extend from the ends of the slats roll along the side rails directly into the groove 108 through opening 110, typically with some initial pushing action by the user. The lead slat and its associated end wheels continue to move around the spiral groove, with successive wheels 64 entering the groove 108 as the cover rolls up upon itself. The slats 12—12 are of a selected width relative to the decreasing radius of the spiral groove so that the truck bed cover radially spirals or rolls in upon itself until the lead wheel reaches the interior end 115 of the groove 108, at which point, the truck bed cover is in a completely retracted position, extending between the two end pieces, with only the very rear slat, typically the tailgate locking slat and perhaps one or two adjacent slats, extending outwardly therefrom, through the opening in the top element 103. In this position of the cover, the truck bed is substantially completely exposed.

One significant advantage of the above described retracting mechanism is its simplicity and reliability. There is no necessity for springs or motors or other elements. Further, the end pieces prevent the rolled-up cover from telescoping or shifting from side-to-side. Still further, the relationship between the slat wheels 64—64 and the shallow groove 108, which is slightly wider and deeper than the wheels, results in the truck bed cover being easily rotatable upon itself.

In the embodiment shown, the rear edge 111 of end piece 100 is 12 inches long by ⅜ inch thick. Referring to FIG. 2, the top edge of end piece 100 extends forwardly from the rear edge approximately 1½ inches, then extends upwardly for approximately ½ inch and then forwardly again for 4⅝ inches, then downwardly ½ inch and then forwardly approximately 2½ inches to the opening 110 of the groove 108. As indicated above, the tab 112 extends forwardly from the opening 110, with surface 13 of the tab 112 providing a continuation of the back surface of the groove 108 so as to provide a continuous surface for connection between the side rail and the groove 108 of end piece 100.

The top edge of end piece 100 extends downwardly approximately ⅛ of an inch at opening 110, thus leaving ⅛ inch of space between the lower edge 117 of tab 112 and the top edge of end piece 100. The top edge extends forwardly again approximately 2 inches, and then downwardly approximately ¼ inch and then forwardly approximately 1½ inches to the front edge 116 of the end piece 100.

In the embodiment shown, the top element 103 has a somewhat different configuration than the top edge of the end pieces, as shown. The rear edge 119 of the top element 103 extends somewhat to the rear of the rear enclosure member 105, providing spacing between the rear surface of the cab of the truck and the retracting mechanism.

In the embodiment shown, each end piece is made from rigid plastic, with the groove 108 molded into the end piece. However, the end piece may be made from metal or other rigid material, and the groove may be either an integral part of the end piece, such as in the embodiment shown, or it may be formed as an attachment thereto. As disclosed above, the embodiment shown does include a top element 103 which substantially closes the top space between the two end pieces, except for a lateral opening for the cover. Likewise, members 105—105 are provided to close off the back, front and bottom of the space between the end pieces, which results in a substantially complete enclosure for the retracted cover.

The above described relationship between the side rails and the end pieces results in any water which may enter the side rails moving into the enclosure for the retracting mechanism. A drain connection may be made from the bottom of the enclosure through the truck bed to permit release of the liquid, thereby maintaining the truck bed itself dry.

FIG. 8 shows a locking mechanism for the truck cover of the present invention. The locking mechanism includes an element 119 which is secured along one edge to the last slat at the rear of the truck. The element 119 includes along one edge thereof a tubular element 118 similar to that for slats 12 in FIGS. 2 and 3. This tubular element 118 interfits with a mating groove element on the edge of the adjacent slat element, resulting in the same interfit connection between element 119 and the adjacent slat 120 in FIG. 8 as occurs between other adjacent slats.

The element 119 includes a rear portion 122 defined by upper and lower members 124, 125 which define an enclosed interior volume 127. Positioned in upper member 124 but extending into interior volume 127 is a lock 128 having a movable arm 130. The rearmost part 129 of rear portion 122 is configured to fit around and mate with a plate 132 which extends along and is secured to the top edge of the tailgate of the truck. The arm 130 fits into and out of a mating opening 134 in the plate 132. Such an arrangement permits the retractable truck bed cover of the present invention to be conveniently locked and unlocked to the tailgate of the truck.

In use, the truck bed cover will at a given time be in a retracted position, rolled up at the rear of the truck bed within the spiraled retracting mechanism. The user then simply grasps element 119 which extends outwardly from the retracting mechanism and pulls it forwardly, the cover coming gradually out of the spiraled retracting mechanism and into and along the side rails on both sides of the truck bed, until the element 117 is adjacent the tailgate, at which point the cover may be locked. This is the fully extended position of the cover. The cover may be readily moved between the retracted and extended positions or some point in between to gain access to the interior of the truck bed.

In a variation, the side rail structure could include an alternate track which would descend from the top edge of the sides of the truck to the bottom of the truck bed at a point part of the way back to the tailgate, thereby providing a secure cover for a space less than the entire length of the truck bed. The truck bed cover could also be locked in that position.

To retract the cover, the user simply pushes the cover toward the cab of the truck, insuring that the end of the cover nearest the cab has started to roll up in the retracting mechanism. The cover then continues to roll up within the spiral retracting mechanism, typically with very little additional effort.

Although a preferred embodiment of the invention has been disclosed herein for purposes of illustration, it should be understood that various changes, modifications and substitutions may be incorporated in such embodiment without departing from the spirit of the invention which is defined by the claims which follow.

We claim:

1. An apparatus for retracting a longitudinally flexible cover for a truck bed or the like, comprising:
   two opposing end pieces positionable on opposite sides of the truck bed near one end thereof, said two end pieces having facing surfaces;
   means supporting said two end pieces in position relative to each other;
   a relatively shallow track located on the facing surfaces of said end pieces, for receiving wheel-like elements extending from opposing end edges of a truck bed cover, said track being in the form of a spiral which closes gradually inwardly such that the cover rolls up upon itself as the wheel-like elements thereof move along said track, wherein said track has a width which is slightly greater than the vertical dimension of the wheel-like elements received therein and slightly deeper than the horizontal dimension of the wheel-like elements, the width of the track being substantially uniform for its entire depth at any point along the track, and wherein adjacent turns of the spiral are separated by a wall which has a substantially uniform thickness from top to bottom thereof and which is quite narrow relative to the width of said track.

2. An apparatus of claim 1, wherein the width of said track remains substantially the same over its entire length.

3. An apparatus of claim 1, including members extending between said two end pieces so as to provide a substantially enclosed volume for the retracted cover.

4. An apparatus of claim 1, wherein said track is molded into the facing surface of each of said two end pieces.

5. An apparatus of claim 1, wherein the spiral is approximately 3½ complete turns.

6. An apparatus of claim 1, wherein said wheel-like elements are mounted for rotation.

7. An apparatus of claim 1, wherein said track is open to receive an wheel-like element in the plane of said track at the large diameter end of the spiral, said spiral opening being located near the top thereof and in the vicinity of the forward edge of said end piece, and wherein the end piece includes a tab which extends forwardly from said spiral opening for mating with the end of an adjacent side rail.

8. An element for guiding and supporting the movement of a retractable cover for truck beds and the like, comprising:
   a side rail, including means for mounting said side rail along the top edges of the truck bed, wherein the side rail includes upper and lower portions which extend inwardly from the sides of the truck bed, the upper and lower portions including facing surfaces, each facing surface having a plurality of grooves therein, wherein the side rail includes a track portion defined in the lower portion to receive edge elements which extend from the end edges of the retractable cover and which are movable along the track portion; and
   a longitudinally extending strip of flexible material, positioned between two facing grooves in the upper and lower portions a relatively small distance from the edge elements.

9. An element of claim 8, wherein each side rail comprises a C-shaped part which includes the upper and lower portions, and a horizontal lip member extending from the top leg of said C-shaped part and in the same plane thereof, wherein the horizontal lip member is adapted to be secured to the top edge of the side of a truck bed.

10. An element of claim 8, including a strip of flexible foam material secured along the top surface of the side rail and extending downwardly to the upper surface of the retractable cover.

11. An element for guiding and supporting the movement of a retractable cover for truck beds and the like, comprising:
   a side rail, including means for mounting said side rail along the top edges of the truck bed, wherein the side rail includes upper and lower portions which extend inwardly from the sides of the truck bed;
   a support member for receiving edge elements which extend from the end edges of the retractable cover, the support element being positioned interiorly of the side rail, wherein the support member extends the length of the side rail and is adjustable laterally so that the distance between an opposing support member in an opposing side rail is maintained constant over the length of the truck bed, even though the distance between the sides of the truck varies between the front and rear of the truck bed.

12. In a retractable cover for a truck bed and the like, a lateral slat forming part of the cover, comprising:
   an elongated, relatively narrow slat element which extends substantially between the respective sides of the truck bed when the cover is in position, the slat element including a depending groove-like receiving element along one side edge and a depending tubular-like element along the opposing side edge adapted to rotatably engage in the groove-like portion of an adjacent slat element, wherein the receiving element includes an inner surface and the tubular element includes an outer surface, the slat element further including a flexible member which extends substantially the entire length of the slat element for sealing the outer surface of the tubular element directly to the inner surface of the engaged receiving element, wherein a plurality of slats elements so fitting together form a cover which is flexible in its longitudinal direction.

13. An element of claim 12, including an edge element which extends from the opposite end edges of the slat elements, capable of being received into side rails positioned along the sides of the truck bed and movable therealong.

14. An element of claim 13, wherein the edge element is a wheel mounted for rotation about a screw-like element which mounts the wheel to the engaged receiving and tubular elements of successive slat elements.

15. An element of claim 17, wherein the tubular element includes a longitudinal opening along its length, wherein the flexible member is positioned partially within the interior of the tubular element and is held therein but extends outwardly through the longitudinal opening sufficiently to sealingly contact the interior surface of the receiving element.

* * * * *

UNITED STATES PATENT AND TRADEMARK OFFICE
CERTIFICATE OF CORRECTION

PATENT NO. : 4,889,381

DATED : December 26, 1989

INVENTOR(S) : Charles C. Tamblyn

It is certified that error appears in the above-identified patent and that said Letters Patent is hereby corrected as shown below:

Claim 12, Line 30, the term "slats" should be--slat-.

Claim 15, Line 1, the numeral "17" should be--12--.

Signed and Sealed this

Twenty-eighth Day of January, 1992

Attest:

HARRY F. MANBECK, JR.

*Attesting Officer*    *Commissioner of Patents and Trademarks*